United States Patent
Jeong et al.

(10) Patent No.: US 8,625,508 B2
(45) Date of Patent: Jan. 7, 2014

(54) APPARATUS AND METHOD FOR TRANSMITTING DATA USING MULTIPLE ANTENNA FOR SINGLE CARRIER FREQUENCY DIVISION MULTIPLE ACCESS SYSTEM

(75) Inventors: Byung Jang Jeong, Daejeon (KR); Jae Young Ahn, Daejeon (KR); Young Jo Ko, Daejeon (KR); Bangwon Seo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 398 days.

(21) Appl. No.: 12/990,347

(22) PCT Filed: Apr. 29, 2009

(86) PCT No.: PCT/KR2009/002268
§ 371 (c)(1),
(2), (4) Date: Oct. 29, 2010

(87) PCT Pub. No.: WO2009/134082
PCT Pub. Date: Nov. 5, 2009

(65) Prior Publication Data
US 2011/0044313 A1    Feb. 24, 2011

(30) Foreign Application Priority Data
Apr. 29, 2008 (KR) .................. 10-2008-0040083

(51) Int. Cl.
*H04Q 7/00* (2006.01)
(52) U.S. Cl.
USPC ........................................ 370/329; 370/334

(58) Field of Classification Search
USPC .................................. 370/210, 329, 330, 334
See application file for complete search history.

(56) References Cited

U.S. PATENT DOCUMENTS

| | | | |
|---|---|---|---|
| 2007/0211807 A1 | 9/2007 | Han et al. | |
| 2009/0262872 A1* | 10/2009 | Prasad et al. | 375/341 |
| 2010/0002575 A1* | 1/2010 | Eichinger et al. | 370/210 |
| 2010/0322343 A1* | 12/2010 | Yeon et al. | 375/295 |
| 2011/0142001 A1* | 6/2011 | Ko et al. | 370/329 |
| 2011/0249762 A1* | 10/2011 | Sun et al. | 375/259 |
| 2012/0057449 A1* | 3/2012 | Takaoka et al. | 370/210 |

FOREIGN PATENT DOCUMENTS

| | | |
|---|---|---|
| JP | 2008-078944 | 4/2008 |
| KR | 1020070089478 | 8/2007 |
| KR | 1020080037113 | 4/2008 |
| WO | WO2008/008748 | 1/2008 |

OTHER PUBLICATIONS

3GPP TSG RAN WGl Meeting #56bis, R1-91492, Mar. 23-27, 2009.

* cited by examiner

*Primary Examiner* — Andrew Lee
(74) *Attorney, Agent, or Firm* — Staas & Halsey LLP

(57) ABSTRACT

A transmission apparatus includes a layer mapper to map a modulated symbol to a plurality of layers, a layer shifter to uniformly divide the symbol mapped to each of the plurality of layers, in a plurality of time domain streams, and a signal transmission unit to perform a DFT on each of the plurality of time domain streams to generate a plurality of frequency domain streams, and to transmit, to a receiving apparatus. The plurality of frequency domain streams are using a plurality of antennas corresponding to each of the plurality of frequency domain streams.

18 Claims, 5 Drawing Sheets

APPARATUS AND METHOD FOR TRANSMITTING DATA USING MULTIPLE ANTENNA FOR SINGLE CARRIER FREQUENCY DIVISION MULTIPLE ACCESS SYSTEM

CROSS REFERENCE TO THE RELATED APPLICATIONS

This application claims the benefit under 35 U.S.C. Section 371, of PCT International Application No. PCT/KR2009/002268, filed Apr. 29, 2009, which claimed priority to Korean Application No. 10-2008-0040083, filed Apr. 29, 2008 in the Korean Patent Office, the disclosures of which are hereby incorporated by reference.

TECHNICAL FIELD

The present invention relates to a technique in which multiple antennas are applied to a mobile communication system using a single carrier frequency division multiple access method.

BACKGROUND ART

An Orthogonal Frequency Division Multiple Access (OFDMA) scheme has been applicable as a basic transmission scheme of most mobile communication systems. However, the OFDMA scheme may have a disadvantage in that a Peak to Average Power Ratio (PAPR) is relatively high. A Single Carrier Frequency Division Multiple Access (SC-FDMA) scheme may perform a Discrete Fourier transform (DFT) on a complex modulated symbol to generate a transmission signal so as to solve the disadvantage of the OFDMA scheme.

A multiple antenna transmission/reception scheme is a scheme that can overcome limitations of restricted frequency resources to achieve a high spectral efficiency, and has been recently applied, in various types, to the mobile communication system together with OFDMA scheme.

When the above described multiple antenna technique is used together with the SC-FDMA scheme, the PAPR of a transmission signal for each antenna may increase unlike when transmitting the transmission signal using a single antenna. Accordingly, in order to apply the multiple antennas while maintaining characteristics of a SC-FDMA signal having a relatively low the PAPR, a new type of multiple antenna single carrier frequency division multiple scheme may be needed, unlike a case where the multiple antennas are used in the OFDMA scheme.

DISCLOSURE OF INVENTION

Technical Goals

An aspect of the present invention provides performance improvement by a spatial multiplexing gain while maintaining a low Peak to Average Power Ratio (PAPR) of a single carrier frequency division multiple access signal even when the single carrier frequency division multiple access signal is transmitted using multiple transmission/reception antennas.

Technical Solutions

According to an aspect of the present invention, there is provided a transmission apparatus, including: a layer mapper to map a modulated symbol to a plurality of layers; a layer shifter to evenly divide the symbols mapped to each of the plurality of layers, in a plurality of time domain streams; and a signal transmission unit to perform a DFT on each of the plurality of time domain streams to generate a plurality of frequency domain streams, and to transmit, to a receiving apparatus, the plurality of frequency domain streams using a plurality of antennas corresponding to each of the plurality of frequency domain streams.

Advantageous Effects

According to the present invention, performance improvement may be achieved by a spatial multiplexing gain while maintaining a low Peak to Average Power Ratio (PAPR) of a Single Carrier Frequency Division Multiple Access (SC-FDMA) signal even when the single carrier frequency division multiple access signal is transmitted using multiple transmit antennas.

Also, the present invention may be equally applied to an Nx Discrete Fourier transform (DFT) spread Orthogonal Frequency Division Multiplexing (OFDM) scheme and a clustered DFT spread OFDM scheme of an expanded type of a SC-FDMA system, as well as the SC-FDMA system.

BEST MODE FOR CARRYING OUT THE INVENTION

Figure 1:
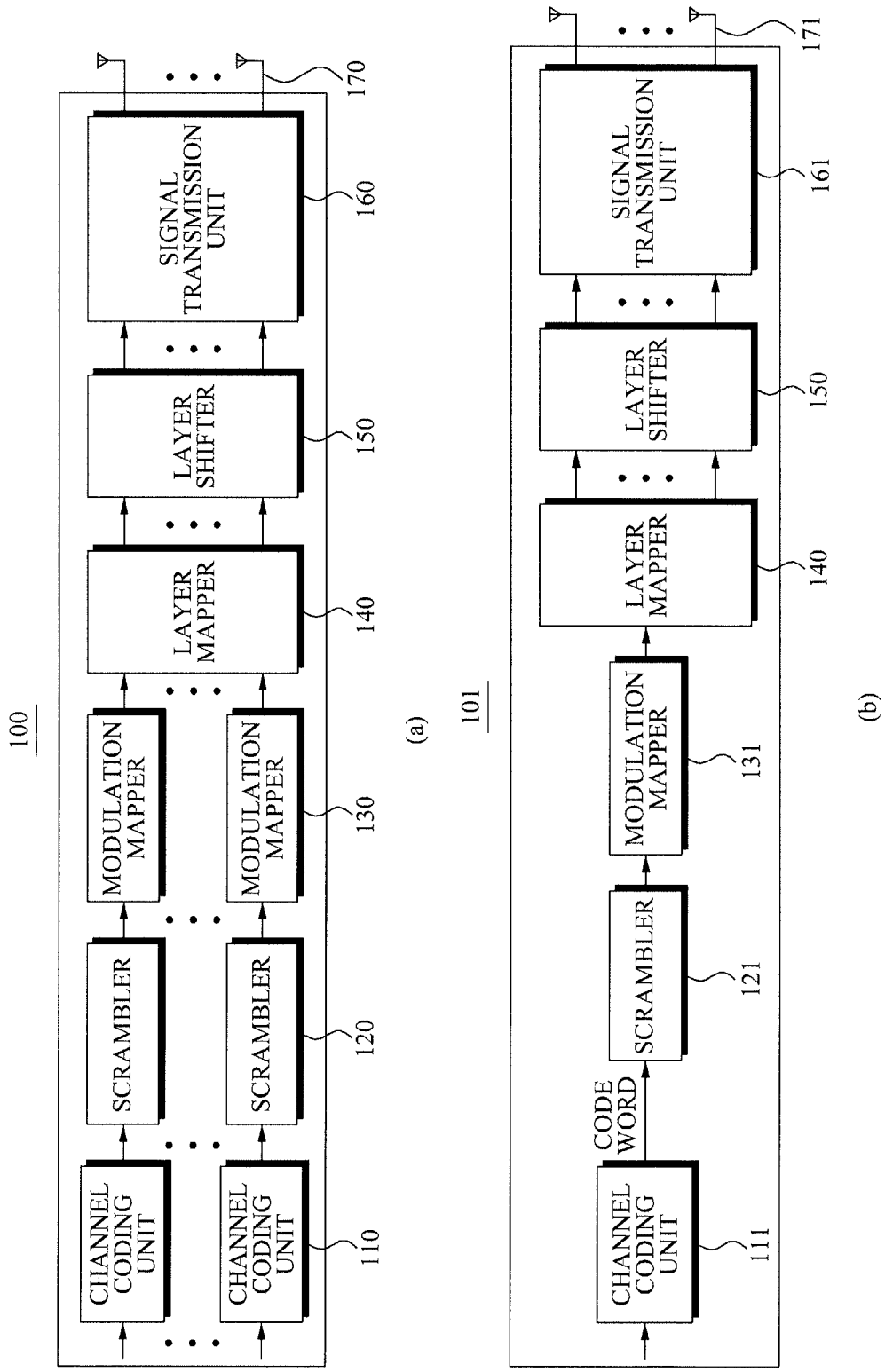
FIGS. 1 (a) and 1 (b) are block diagrams illustrating a structure of a transmission apparatus according to example embodiments.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIGS. 1 (a) and 1 (b) are block diagrams illustrating a structure of a transmission apparatus according to example embodiments.

FIG. 1 (a) is a block diagram illustrating a structure of a transmission apparatus transmitting multiple codewords.

The transmission apparatus 100 according to the present example embodiment includes a channel coding unit 110, a scrambler 120, a modulation mapper 130, a layer mapper 140, a layer shifter 150, and a signal transmission unit 160.

The channel coding unit 110 may perform a channel coding on bit streams. A convolution code, a block code, a turbo code, or a Low Density Parity Check (LDPC) code may be applicable in the channel coding unit 110.

The scrambler 120 may scramble $a^q(0), L, a^q(N_{bit}^q-1)$ of a bit stream coded by the channel coding unit 110 into $b^q(i)$ of a bit stream having the same length as $a^q(0), L, a^q(N_{bit}^q-1)$ to thereby generate $a^q_b(i)$. Here, the superscript q may denote a q-th codeword, and $N_{bit}^q$ may denote a number of bits within a corresponding codeword. A scrambling sequence $b^q$ (i) may generally include identification information for each user.

The modulation mapper 130 may generate, from $\tilde{b}^q$ of a scrambled bit stream, $c^q$ (0),L, $c^q$ ($M_{symb}^q$−1) of a complex symbol stream subjected to a QPSK (Quadratic Phase Shift Modulation) or a QAM (Quadratic Amplitude Modulation). Here, $M_{symb}^q$ may denote a number of symbols for each corresponding codeword. In general, as for a modulation, QPSK, 16 QAM, 64 QAM, and the like may be considered. A modulation order may be transmitted by signaling from an upper layer.

The layer mapper 140 may map a modulation symbol stream included in each codeword to one layer or multiple layers. The layer mapper 140 may be configured in the same manner as that provided in 'Third Generation Partnership Project, Technical Specification (3GPP TS) 36.211', when a number of codewords is 1 or 2, and a number of layers is limited to be from 1 to 4. This is limiting the number of codewords or layers for the purpose of simplification of Equations, and the present invention may be effective with respect to an arbitrary number of codewords and layers. Here, $d^{layer}$ (k), k=0,1,K, $N_{symb}^{layer}$−1 may denote an output signal stream of the layer mapper, and 'layer' of a superscript may denote the layer-th layer.

[Equation 1]

| Number of layers | Number of codewords | Codeword-layer mapping $k = 0, 1, \ldots, N_{symb}^{layer} - 1$ | |
|---|---|---|---|
| 1 | 1 | $d^1(k) = c^1(k)$ | $N_{symb}^{layer} = M_{symb}^1$ |
| 2 | 2 | $d^1(k) = c^1(k)$ $d^2(k) = c^2(k)$ | $N_{symb}^{layer} = M_{symb}^1 = M_{symb}^2$ |
| 2 | 1 | $d^1(k) = c^1(2k)$ $d^2(k) = c^1(2k+1)$ | $N_{symb}^{layer} = M_{symb}^1/2$ |
| 3 | 2 | $d^1(k) = c^1(k)$ $d^2(k) = c^2(2k)$ $d^3(k) = c^2(2k+1)$ | $N_{symb}^{layer} = M_{symb}^1 = M_{symb}^2/2$ |
| 4 | 2 | $d^1(k) = c^1(2k)$ $d^2(k) = c^1(2k+1)$ $d^3(k) = c^2(2k)$ $d^4(k) = c^2(2k+1)$ | $M_{symb}^{layer} = M_{symb}^1/2 = M_{symb}^2/2$ |

The number of layers may be determined by a radio channel rank transmitted by signaling of the upper level, and the like.

The layer shifter 150 may uniformly divide, in a plurality of time domain streams, the symbols mapped to each layer. Accordingly, each of the plurality of time domain streams may include the symbols of each layer by an approximately same number. The approximately same numbered-symbols may denote that the symbols of each layer are included in each of the plurality of time domain streams by the approximately same amount.

Each of the plurality of time domain streams may be changed into a transmission signal type through the signal transmission unit 160, and transmitted via each transmission antenna 170. Consequently, signals transmitted via each transmission antenna 170 may uniformly include the symbols of each layer by the approximately the same number.

Detailed operations of the layer shifter will be hereinafter described in detail with reference to FIGS. 3 and 4.

The signal transmission unit 160 may receive a stream generated by the layer shifter as an input to thereby generate a Single Carrier Frequency Division Multiple Access (SC-FDMA) signal. The signal transmission unit 160 includes a Discrete Fourier Transform (DFT) spread, a resource mapper, a precoder, an Inverse Discrete Fourier Transform (IDFT) unit, and a cyclic prefix inserting unit.

FIG. 1 (b) is a block diagram illustrating a structure of a transmission apparatus 101 transmitting a single codeword (SCW). The transmission apparatus 100 transmitting multiple codewords includes a plurality of channel coding units 110 processing each codeword, a plurality of scramblers 120, and a plurality of modulation mappers 130, however, the transmission apparatus 101 transmitting the SCW includes a channel coding unit 111, a scrambler 121, and a modulation mapper 131.

The channel coding unit 101, the scrambler 121, the modulation mapper 131, the layer mapper 141, the layer shifter 151, and the signal transmission unit 161 each being included in the transmission apparatus 101 may be operated similarly to blocks 110, 120, 130, 140, 150, and 160 illustrated in FIG. 1 (a).

Figure 2:
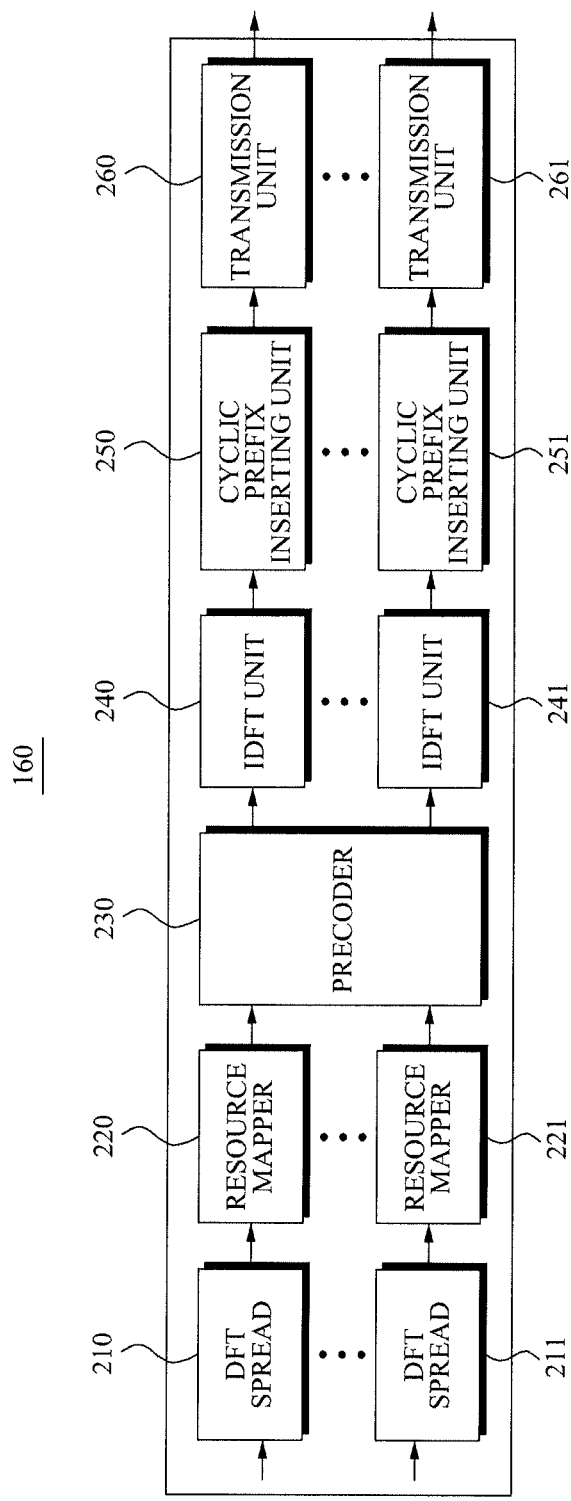
FIG. 2 is a block diagram illustrating a structure of a signal transmission unit according to example embodiments, in detail.

FIG. 2 is a block diagram illustrating a structure of the signal transmission unit 160 according to example embodiments, in detail. The signal transmission unit 160 according to the present example embodiment includes a plurality of DFT spreads 210 and 211, a plurality of resource mappers 220 and 221, a precoder 230, a plurality of IDFT units 240 and 241, a plurality of cyclic prefix inserting units 250 and 251, and a plurality of transmission units 260 and 261.

The plurality of DFT spreads 210 and 211 may convert each of the plurality of time domain streams to generate a plurality of frequency domain streams corresponding to each of the plurality of time domain streams. The plurality of DFT spreads 210 and 211 may disperse and transform the plurality of time domain symbols, each having a predetermined length, into a plurality of frequency domain symbols through DFT. A block being comprised of predetermined length of symbols subjected to a single DFT at a time, may be referred to as a DFT block.

The plurality of resource mappers 220 and 221 may map each of the plurality of frequency domain streams to a frequency band corresponding to each of the plurality of frequency domain streams. Specifically, data dispersed into the frequency domain may be mapped to a frequency band corresponding to each frequency domain.

The precoder 230 may be applied to the frequency domain in a linear matrix type so as to obtain a beamforming gain or an additional diversity gain. This may be considered even in a time domain prior to the DFT spread in an equivalent type.

The IDFT units 240 and 241 may perform an IDFT on each of the plurality of frequency domain streams mapped to each frequency band to thereby generate a plurality of time domain signals. A Peak to Average Power Ratio (PAPR) of the time domain signal generated by the IDFT units 240 and 241 may be approximately the same as a PAPR of an input signal of the DFT spreads 210 and 211.

The cyclic prefix inserting units 250 and 251 may insert a cyclic prefix signal in each of the time domain signals.

The transmission units 260 and 261 may transmit each time domain signal, which is generated by the IDFT unit and in which the cyclic prefix is inserted, using each antenna.

Throughout the present disclosure, it is assumed that transmission of pilot signals or reference signals used for channel estimation, and channel estimation in a receiving end using the transmission of pilot signals or reference signals may be performed in a separate general method.

Figure 3:
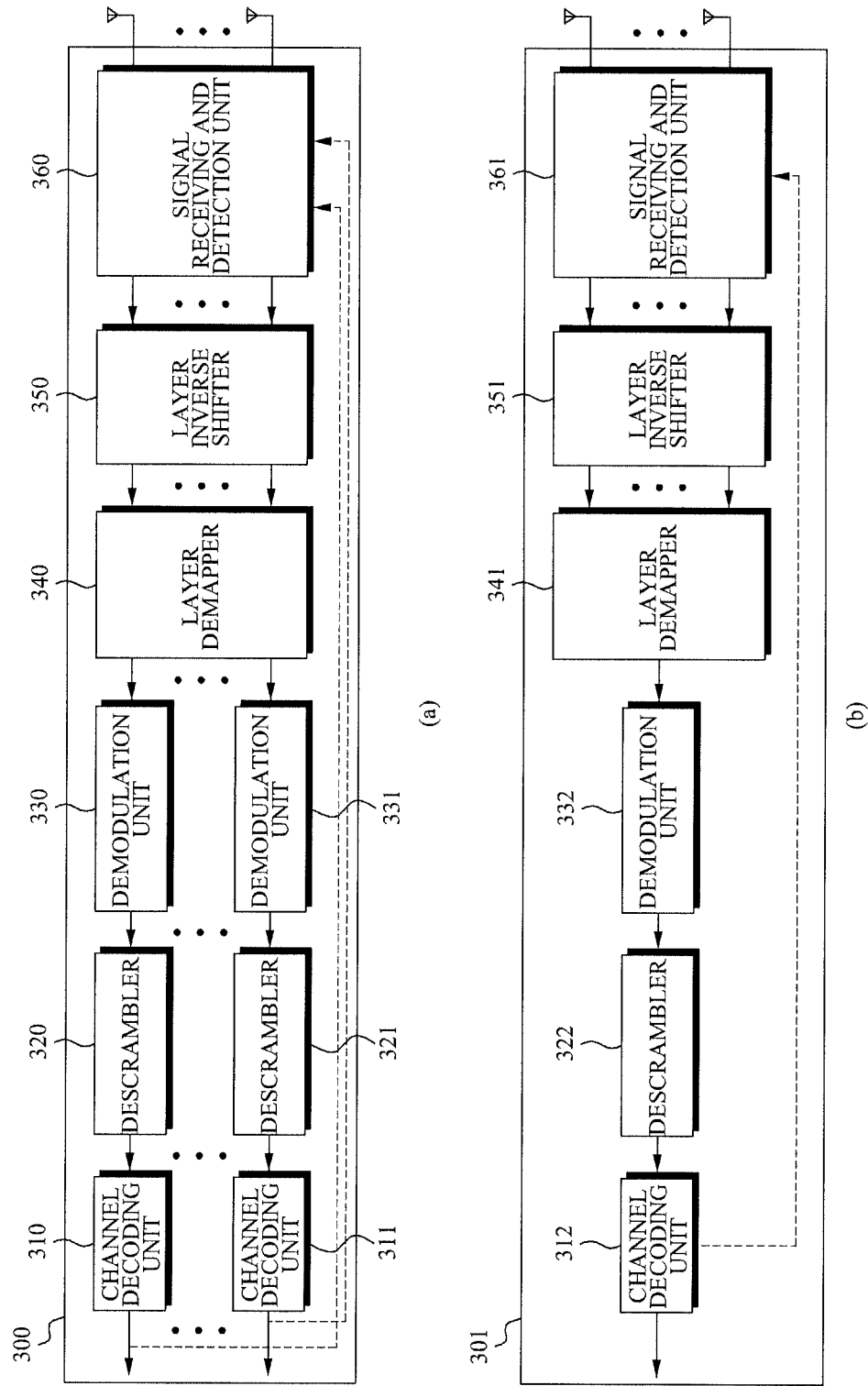
FIGS. 3 (a) and 3 (b) are block diagrams illustrating a structure of a receiving apparatus according to example embodiments.

FIGS. 3 (a) and 3 (b) are block diagrams illustrating a structure of a receiving apparatus according to example embodiments.

FIG. 3 (a) is a block diagram illustrating a structure of a receiving apparatus 300 receiving multiple codewords. The receiving apparatus 300 includes a plurality of channel decoding units 310 and 311, a plurality of descramblers 320 and 321, a plurality of demodulation units 330 and 331, a layer demapper 340, a layer inverse shifter 350, and a signal receiving and detection unit 360.

The signal receiving and detection unit 360 may perform processes such as synchronization, cyclic prefix removal, DFT, channel estimation, equalization, IDFT spread, and the like, and may be similar to a signal receiving and detection unit of a general multiple antenna SC-FDMA system. In this instance, an equalizer may receive, as a feedback input, an output of the channel decoding unit in accordance with a type of the equalizer, thereby improving performance of the equalizer.

The layer inverse shifter 350 may be operated reversely to the layer shifter 150 of the transmission apparatus 100. Specifically, the layer inverse shifter 350 may receive, as an input, a stream in which symbols for each layer are mixed, and re-divide the received stream into a signal for each layer using an inverse shifting process. Specific operations of the inverse shifter 350 will be described in detail with reference to FIG. 5.

The layer demapper 340 may be operated reversely to the layer mapper 140 of the transmission apparatus 100. Specifically, the layer demapper 340 may re-configure the signal for each layer as the block being comprised of the symbols included in each codeword.

The demodulation units 330 and 331 may be operated in reverse of the modulation mapper 130 of the transmission apparatus 100. Specifically, the demodulation units 330 and 331 may convert complex symbols such as detected QPSK, 16 QAM, 64 QAM, and the like in a bit unit. In this instance, according to a type of the receiving apparatus, the demodulation units 330 and 331 may receive a soft input and generate a soft output.

The descramblers 320 and 321 may be operated in reverse of the scrambler 120 of the transmission apparatus 100. Specifically, the descramblers 320 and 321 may descramble a scrambled bit stream to coded data bits.

The channel decoding unit 310 and 311 may apply an inverse process of a coding method of the channel coding unit 110 of the transmission apparatus 100 to thereby decode a coded data bit.

FIG. 3 (b) is a block diagram illustrating a structure of the receiving apparatus 301 receiving a single codeword.

The receiving apparatus 301 includes a channel decoding unit 312, a descrambler 322, and a demodulation unit 332. Blocks 312, 322, 332, 341, 351, and 361 included in the receiving apparatus 301 receiving the single codeword may be operated similarly to the blocks 310, 311, 320, 321, 330, 331, 340, 350, and 360 included in the receiving apparatus 302 receiving the multiple codewords.

Figure 4:
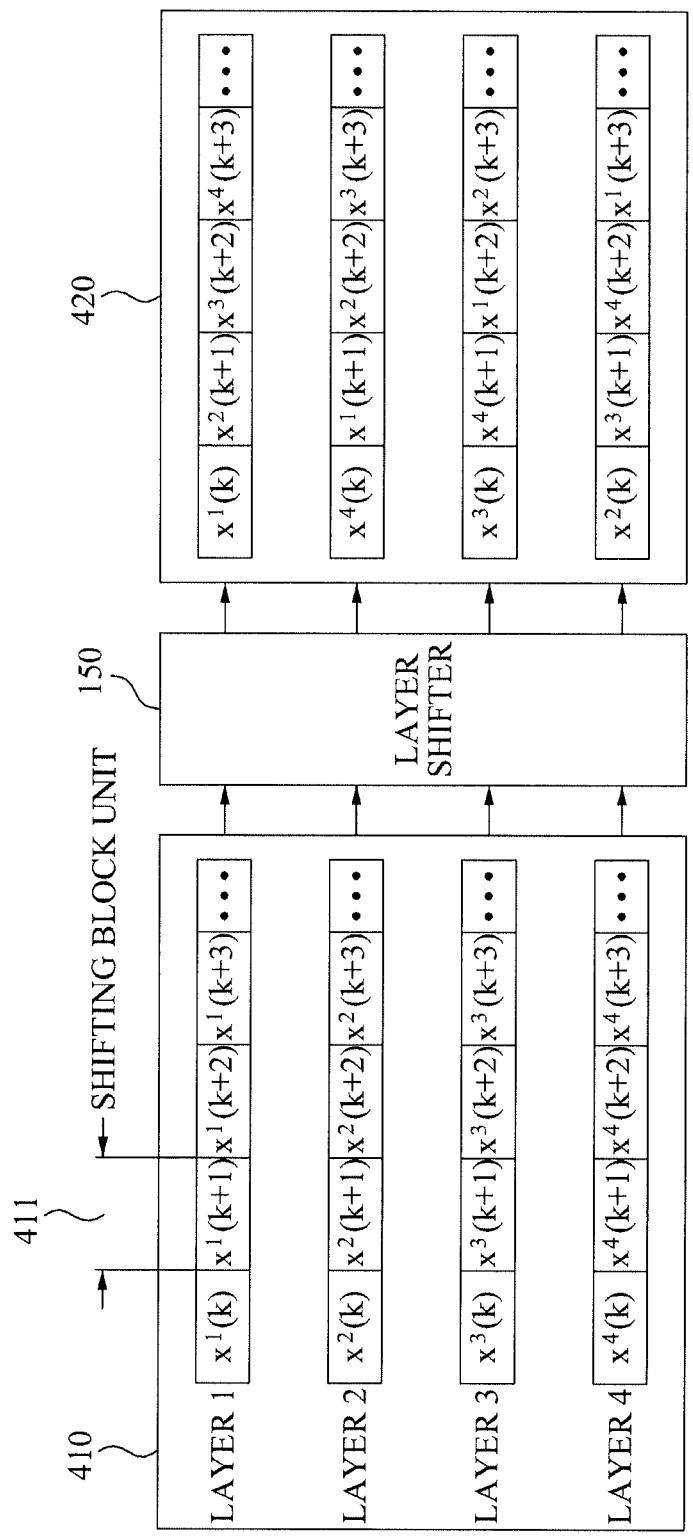
FIG. 4 is a conceptual diagram illustrating operations of a layer shifter according to example embodiments.

FIG. 4 is a conceptual diagram illustrating operations of a layer shifter according to example embodiments. For convenience of description, a case where four layers exist is described, however, the present invention may be applicable regardless of a number of layers.

The layer shifter 150 may receive a plurality of layer signal streams 410, and shift a signal of each layer by a shifting block unit 411 to thereby generate a layer shift output 420. In this process, the shifting block unit 411 may include 1) a single modulation symbol, 2) a block being comprised of a certain number of consecutive modulation symbols, 3) a single DFT block, 4) a certain number of consecutive DFT blocks, and the like. This may be represented as Equation 2 below.

$$x^q(k)=[d^q(k \cdot N_{block})d^q(k \cdot N_{block}+1)Ld^q(k \cdot N_{block}+N_{block}-1)]. \quad \text{[Equation 2]}$$

wherein $N_{block}$ represents the size of a shifting block, and $d^q(n)$ represents an n-th modulation symbol of a q-th layer. In this instance, an input and output of the layer shifter may be represented as Equation 3 below. The layer shifter may determine $N_{block}$ of the size of the shifting block according to the size of DFT spread unit of the signal transmission unit.

$$\begin{pmatrix} y^1(k) & y^1(k+1) & y^1(k+2) & y^1(k+3) \\ y^2(k) & y^2(k+1) & y^2(k+2) & y^2(k+3) \\ y^3(k) & y^3(k+1) & y^3(k+2) & y^3(k+3) \\ y^4(k) & y^4(k+1) & y^4(k+2) & y^4(k+3) \end{pmatrix} = \quad \text{[Equation 3]}$$

$$\begin{pmatrix} x^1(k) & x^2(k+1) & x^3(k+2) & x^4(k+3) \\ x^4(k) & x^1(k+1) & x^2(k+2) & x^3(k+3) \\ x^3(k) & x^4(k+1) & x^1(k+2) & x^2(k+3) \\ x^2(k) & x^3(k+1) & x^4(k+2) & x^1(k+3) \end{pmatrix},$$

wherein $x^q(k)$ represents a k-th block of the q-th layer represented as Equation 2, and $y^s(k)$ represents a k-th block of a s-th stream in which signals for each layer are divided/mixed. In this instance, when a value of $N_{block}$ (or a value of the shifting block unit 411 of FIG. 4) is '1', the layer shifting may be formed in a single modulation symbol unit, and when the value of $N_{block}$ is the same as the size of DFT spread block, the layer shifting may be formed in a DFT block unit.

The layer shifting may not be configured only as illustrated in Equations 2 and 3 and FIG. 3, and may be configured by a different type of shifting pattern. Specifically, the layer shifter may be configured in a type in which symbols included in all layers are interleaved by a predetermined specific structure. Also, the layer shifting may be achieved by changing a phase of the symbol included in each layer. An example for the layer shifting achieved by changing the phase of the symbol, in a case where a number of layers is '2', may be represented as Equation 4 below.

$$\begin{pmatrix} y^1(k) & y^1(k+1) \\ y^2(k) & y^2(k+1) \end{pmatrix} = \begin{pmatrix} x^1(k) & (x^2(k+1))^* \\ -(x^2(k))^* & x^1(k+1) \end{pmatrix}, \quad \text{[Equation 4]}$$

wherein $(x^q(k))$ represents a complex conjugate of $x^q(k)$.

As described above, the layer shifter may be configured in various types. Specifically, the layer shifter may arbitrarily determine an order of each symbol.

The layer shifter 150 according to the present invention may be located in a time domain prior to the DFT spread 210. Also, the layer shifter 150 according to the present invention may generate a stream in which signals for each layer are evenly divided/mixed, by layer-shifting each layer. The layer shifter 150 may not change the amplitude of symbols included in each layer. A transmission signal for each antenna, generated by the signal transmission unit 160 after the layer is layer-shifted in the above described manner, may maintain a relatively low PAPR.

Figure 5:
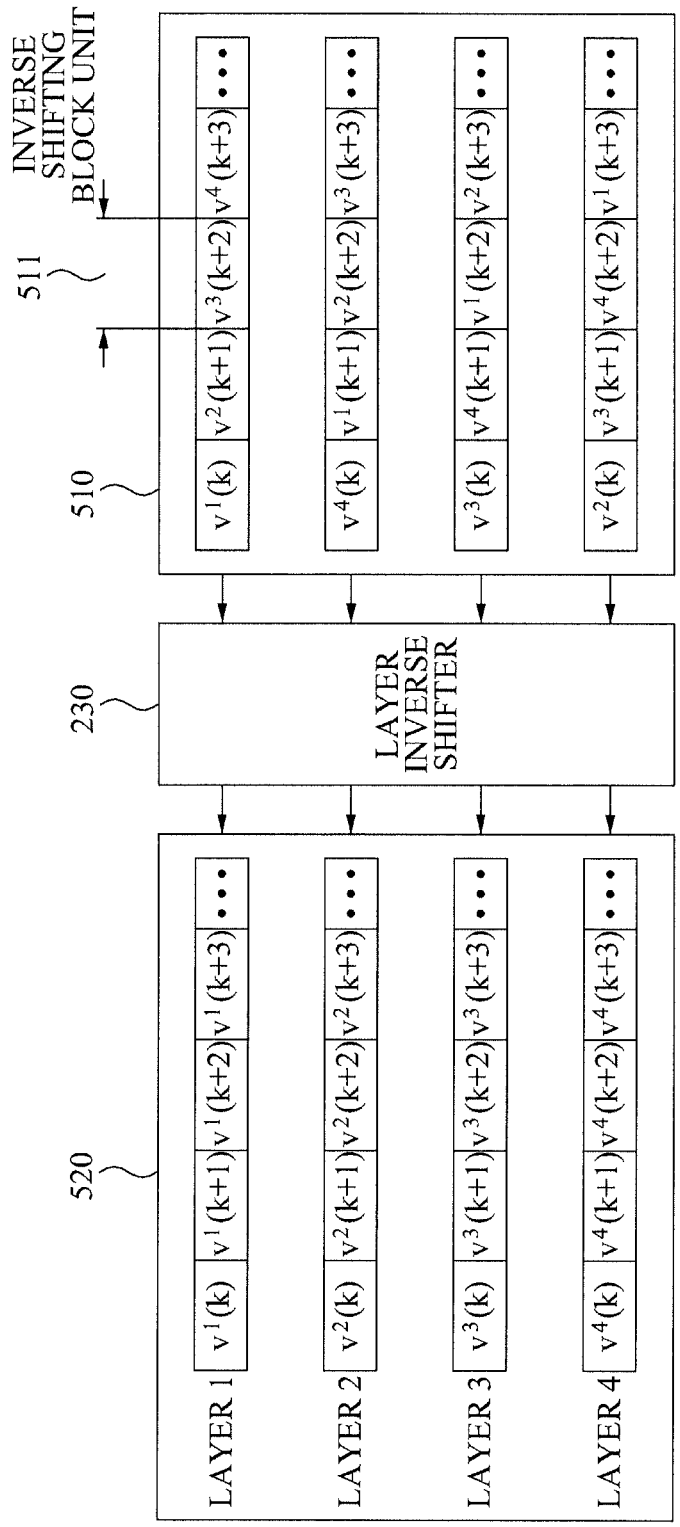
FIG. 5 is a conceptual diagram illustrating operations of a layer inverse shifter according to example embodiments.

FIG. 5 is a conceptual diagram illustrating operations of a layer inverse shifter according to example embodiments. For convenience of description, a case where four layers exist is described, however, the present invention may be applicable regardless of a number of layers.

The layer shifter 230 may receive a plurality of layer signal streams 510, and shift each stream by an inverse shifting block unit 511 in a block unit to thereby generate a layer inverse shifter output 520. In this instance, the size of an inverse shifting block may be $N_{block}$, which is identical to the size of the shifting block in the transmission end. The layer inverse shifter output 520 may be restored to a state where symbols included in each stream are included in an original layer. This may be represented as Equation 5 below.

$$\begin{pmatrix} u^1(k) & u^1(k+1) & u^1(k+2) & u^1(k+3) \\ u^2(k) & u^2(k+1) & u^2(k+2) & u^2(k+3) \\ u^3(k) & u^3(k+1) & u^3(k+2) & u^3(k+3) \\ u^4(k) & u^4(k+1) & u^4(k+2) & u^4(k+3) \end{pmatrix} = \begin{pmatrix} v^1(k) & v^2(k+1) & v^3(k+2) & v^4(k+3) \\ v^4(k) & v^1(k+1) & v^2(k+2) & v^3(k+3) \\ v^3(k) & v^4(k+1) & v^1(k+2) & v^2(k+3) \\ v^2(k) & v^3(k+1) & v^4(k+2) & v^1(k+3) \end{pmatrix},$$ [Equation 5]

wherein $v^s$ (k) represents a k-th block of a s-th receiving stream, and $u^q$ (k) represents a k-th block of a q-th layer being configured by the layer inverse shifting.

The layer inverse shifter of the receiving end may perform a inverse process of the layer shifter of the transmission end.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A transmission apparatus, comprising:
a layer mapper to map, to at least one layer, a modulated symbol included in a codeword;
a layer shifter to evenly divide, in a plurality of time domain streams, the modulated symbol mapped to each of the at least one layer; and
a signal transmission unit to generate a single carrier frequency division multiple access signal based on the plurality of time domain streams, and to transmit the single carrier frequency division multiple access signal using a plurality of antennas.

2. The transmission apparatus of claim 1, wherein the layer shifter shifts an order or phase of the modulated symbol mapped to each of the at least one layer, and generates the plurality of time domain streams while maintaining the amplitude of the modulated symbols.

3. The transmission apparatus of claim 1, wherein the layer shifter divides, into a plurality of blocks, adjacent symbols each having a predetermined length from among the symbols included in each of the at least one layer, and combines the plurality of blocks to generate the plurality of time domain streams.

4. The transmission apparatus of claim 1, wherein the signal transmission unit
performs a Discrete Fourier transform (DFT) on the plurality of time domain streams to generate a plurality of frequency domain streams,
maps the plurality of frequency domain streams to a frequency band corresponding to each of the plurality of frequency domain streams, and
performs an Inverse Discrete Fourier Transform (IDFT) on the mapped frequency domain streams to generate the plurality time domain streams into the single carrier frequency division multiple access signal.

5. A transmission apparatus, comprising:
a layer mapper to map a modulated symbol to a plurality of layers;
a layer shifter to uniformly divide the symbol mapped to each of the plurality of layers, in a plurality of time domain streams; and
a signal transmission unit to perform a DFT on each of the plurality of time domain streams to generate a plurality of frequency domain streams, and to transmit, to a receiving apparatus, the plurality of frequency domain streams using a plurality of antennas corresponding to each of the plurality of frequency domain streams.

6. The transmission apparatus of claim 5, wherein the layer shifter shifts a phase or order of the modulated symbols mapped to each of the plurality of layers to generate the plurality of time domain streams.

7. The transmission apparatus of claim 6, wherein the layer shifter arbitrarily determines the order of the modulated symbols.

8. The transmission apparatus of claim 5, wherein the layer shifter maintains a magnitude of the modulated symbols mapped to each of the plurality of layers.

9. The transmission apparatus of claim 5, wherein the layer shifter divides, into a plurality of blocks, adjacent symbols each having a predetermined length from among the modulated symbols mapped to each of the plurality of layers, and combines the plurality of blocks to generate the plurality of time domain streams.

10. The transmission apparatus of claim 5, wherein the layer shifter determines the predetermined length based on the size of a DFT of the signal transmission unit.

11. The transmission apparatus of claim 5, wherein the signal transmission unit
maps the plurality of frequency domain streams to a frequency band corresponding to each of the plurality of frequency domain streams,
performs an IDFT on each of the plurality of frequency domain streams mapped to the frequency band to generate a plurality of time domain signals, and
transmits, to the receiving apparatus, each of the plurality of time domain signals using each of the plurality of antennas.

12. The transmission apparatus of claim 5, further comprising:
a precoding unit to multiply each of the plurality of frequency domain streams by a precoding matrix,
wherein the signal transmission unit performs an IDFT on the plurality of frequency domain streams having been multiplied by the precoding matrix.

13. The transmission apparatus of claim 5, further comprising:
a channel coding unit to perform a channel coding on data bits;
a scrambler to scramble the channel coded data bits; and
a modulation unit to modulate the scrambled data bits to generate the modulated symbol.

14. A receiving apparatus, comprising:
a signal receiving unit to receive, using a plurality of antennas corresponding to the plurality of time domain streams, a plurality of time domain streams, and to perform a DFT on each of the plurality of time domain streams to generate a plurality of frequency domain streams; and a layer inverse-shifter to map, to a plurality of layers, a plurality of symbols uniformly included in each of the plurality of frequency domain streams.

15. The receiving apparatus of claim 14, wherein the layer inverse-shifter shifts a phase or order of the plurality of symbols to generate the plurality of layers.

16. The receiving apparatus of claim 14, wherein the layer inverse-shifter maintains the amplitude of the plurality of symbols.

17. The receiving apparatus of claim 14, wherein the layer inverse-shifter divides, into a plurality of blocks, adjacent symbols each having a predetermined length from among the plurality of symbols uniformly included in each of the plurality of frequency domain streams, and combines the plurality of blocks to generate the plurality of layers.

18. The receiving apparatus of claim 14, further comprising:
- a demodulation unit to demodulate the plurality of symbols mapped to the plurality of layers to generate scrambled data bits;
- a descrambler to descramble the scrambled data bits; and
- a channel decoding unit to perform a channel decoding on the scrambled data bits.

* * * * *